United States Patent [19]

Dickey

[11] 4,188,843

[45] Feb. 19, 1980

[54] ROTARY DIE CUTTING ASSEMBLY FOR CUTTING LABELS

[75] Inventor: Daniel M. Dickey, Modesto, Calif.

[73] Assignee: B & H Manufacturing Company, Inc., Ceres, Calif.

[21] Appl. No.: 871,554

[22] Filed: Jan. 23, 1978

[51] Int. Cl.[2] .......................... B23D 25/02; B26F 1/08

[52] U.S. Cl. .......................................... 83/304; 83/344; 83/346

[58] Field of Search ........................... 83/304, 343–348, 83/902, 481

[56] References Cited

U.S. PATENT DOCUMENTS

| | | | |
|---|---|---|---|
| 2,361,401 | 10/1944 | Hothersall | 83/346 X |
| 3,668,963 | 6/1972 | Davis | 83/346 |
| 3,720,126 | 3/1973 | Kranz | 83/346 X |
| 3,728,918 | 4/1973 | Helm | 83/346 X |
| 3,881,383 | 5/1975 | Alverth | 83/346 X |

*Primary Examiner*—J. M. Meister

*Attorney, Agent, or Firm*—Edward B. Gregg

[57] ABSTRACT

Rotary cutting die and rotary anvil mounted in parallel and in tangent contact, with frame mounting same, such frame being in two parts including a first part at one end of the die and anvil capable of attachment to and detachment from the frame of a larger machine such as a label cutting and label applying machine for cutting labels from continuous label stock and applying the severed labels to containers, such frame having a second part at the other ends of the die and anvil which can be attached to and detached from the first part; also means for adjustment of the anvil and for automatic retraction of the anvil from contact with the die.

6 Claims, 7 Drawing Figures

ROTARY DIE CUTTING ASSEMBLY FOR CUTTING LABELS

In a related application filed concurrently herewith, Wolfgang Hoffmann Serial No. 875,891, filed Feb. 7, 1978 entitled "LABELING APPARATUS AND METHOD FOR CONTINUOUSLY SEVERING LABELS FROM CONTINUOUS LABEL STOCK AND APPLYING THE SEVERED LABELS TO CONTAINERS", there is described a method and apparatus including a rotary die cutter and anvil for continuously severing labels, especially "shaped" labels, from continuous printed label stock and applying the severed labels to the containers. By "shaped labels" is meant labels which are non-rectangular, e.g. which are oval in shape, such that when severed from a continuous web scrap material is left over.

It is an object of the present invention to provide a rotary die cutter-rotary anvil assembly which can be used in the apparatus of the aforesaid Hoffmann patent application and can be used generally for the severance of labels (or for that matter, other segments of a film material, paper or plastic) from continuous stock.

Among the particular objects of the present invention is to provide a unit which includes a rotary die, a rotary anvil, means for adjusting the relation of the die to the anvil and means whereby the assembly can be readily mounted on and detached from a larger machine such as a labeling machine which severs labels, transports severed labels to a label applying station and applies the labels at such station to containers.

The above and other objects of the invention will be apparent from the ensuing description and the appended claims.

Certain forms of the invention are illustrated by way of example in the accompanying drawings in which.

Figure 1:
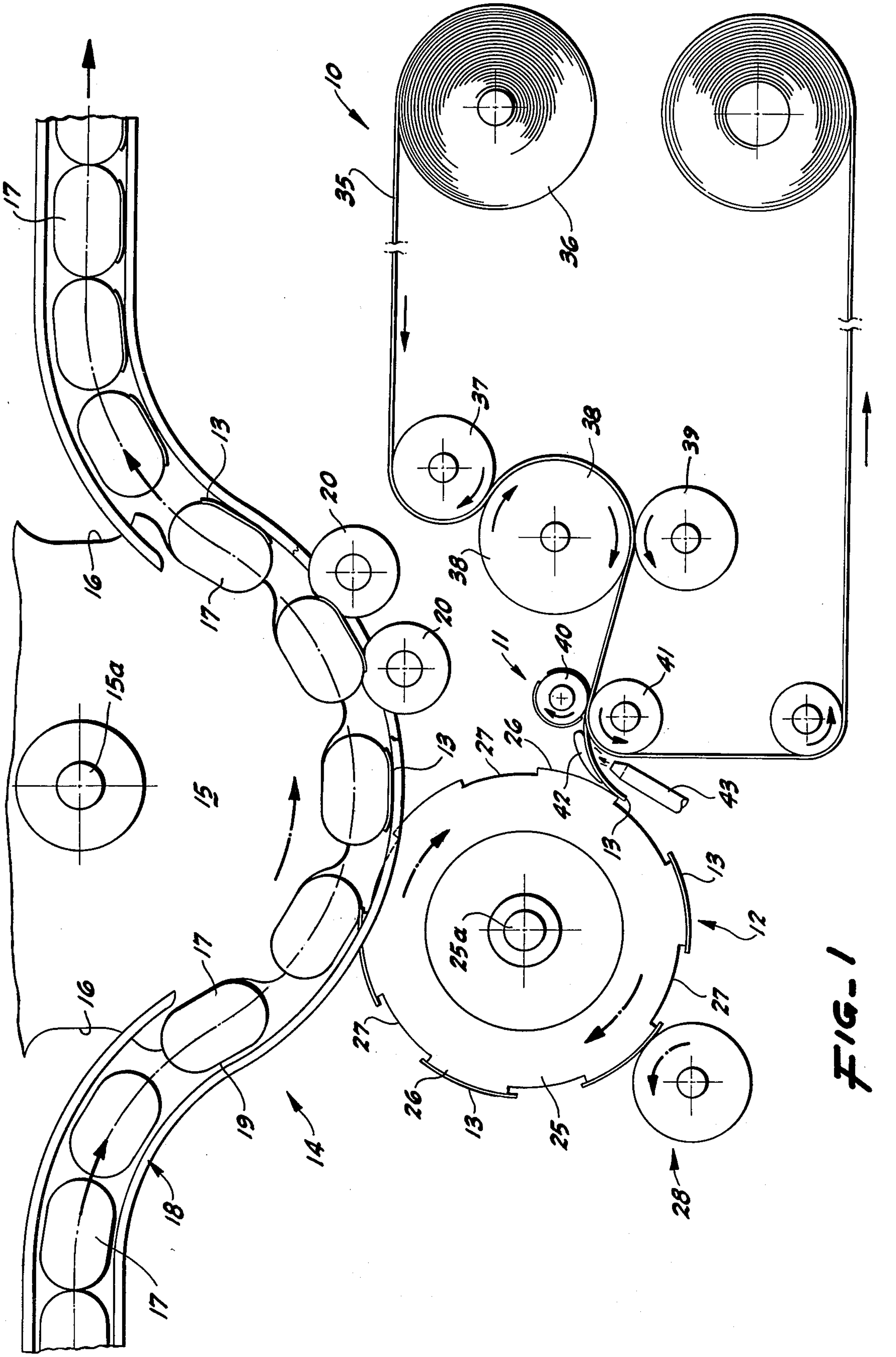
FIG. 1 is a somewhat diagrammatic view of an entire labeling apparatus and system in accordance with the Hoffmann invention.

Referring now first to FIG. 1, the apparatus is generally designated by the reference numeral 10 and it comprises a die cutting assembly 11, a label transfer assembly 12 for transferring severed labels 13 and a container feed generally designated as 14. The container feed comprises in this instance a star wheel 15 rotating with shaft 15*a* and having pockets 16 for reception of containers 17 which are supplied by container feed 18. The containers are shown as being oval, each having a flat side 19 to which a label is to be applied. Also shown downstream from the label applying station are rollers 20 which serve the purpose of smoothing and more securely and evenly sealing a label after it has been applied at the label applying station, which is designated as L.

It will be understood that the shape of the containers may be different from that shown, for example, they may be square or cylindrical or any other shape susceptible of continuous label application. It will also be understood that the container feed may be different than that shown, for example, it may employ a feed screw.

The label transfer assembly 12 is shown as a vacuum drum 25 rotating with a shaft 25*a* and having projecting pads or lands 26 to which the labels 13 are adhered by vacuum, such lands being separated by recessed areas 27. Also shown is a glue applicator 28.

Vacuum drum feeds of this type are well known, for example, those shown in my U.S. Pat. No. 3,834,963.

As is well known in the art, such a vacuum drum is supplied with vacuum means including openings (not shown) in the surface of the drum which attach each label by vacuum when applied thereto by the cutting mechanism, the vacuum being interrupted to release the label at a label applying station L. The glue applicator 28 may be any of several known types such as those shown in one or more of the above-mentioned patent and it may apply glue only to the leading edge, to the leading edge and the trailing edge or to the entire exposed surface of the label. Such apparatus is well known in the art and requires no further description herein.

Continuous label stock 35 is shown which may be drawn from a roll 36 and will ordinarily be pre-printed with labels. However, if desired, a printing unit (not shown) may be installed and synchronized with the labeling applying apparatus 10 to print labels simultaneously with the labeling applying procedure.

This label stock is shown trained about rollers 37, 38 and 39, the roller 38 being the driven roller which pulls the label stock off the roll 36. The label then passes between a rotary die cutter 40 and an anvil roller 41 and is guided by a guide member 42 to the drum 25. An air nozzle 43 is shown which acts together with the guide 42 to direct the labels accurately to the drum.

Figure 2:
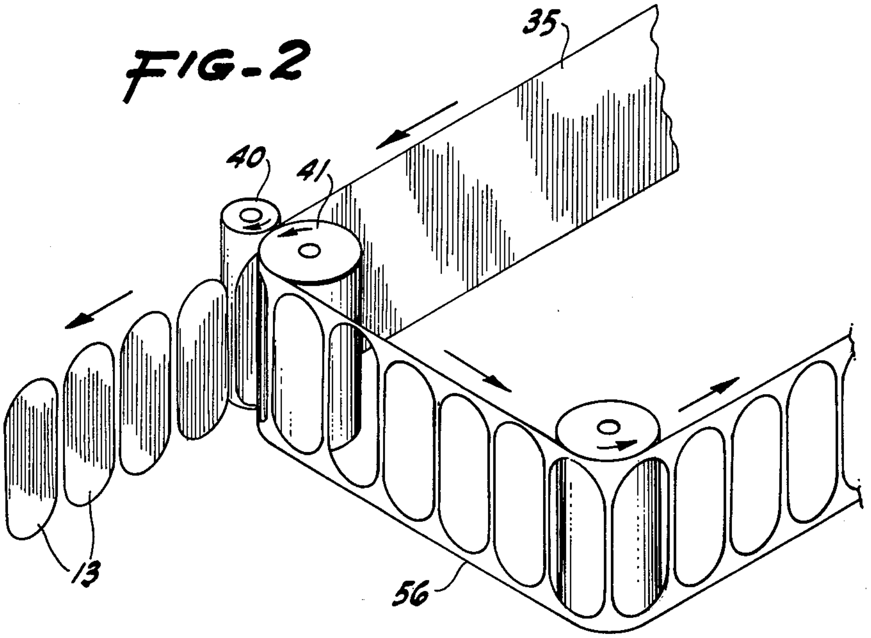
FIG. 2 is a perspective view showing the manner in which (according to the Hoffmann patent application) labels (oval in this case) are severed from a continuous printed label stock and how continuous scrap material is handled.
Figure 3:
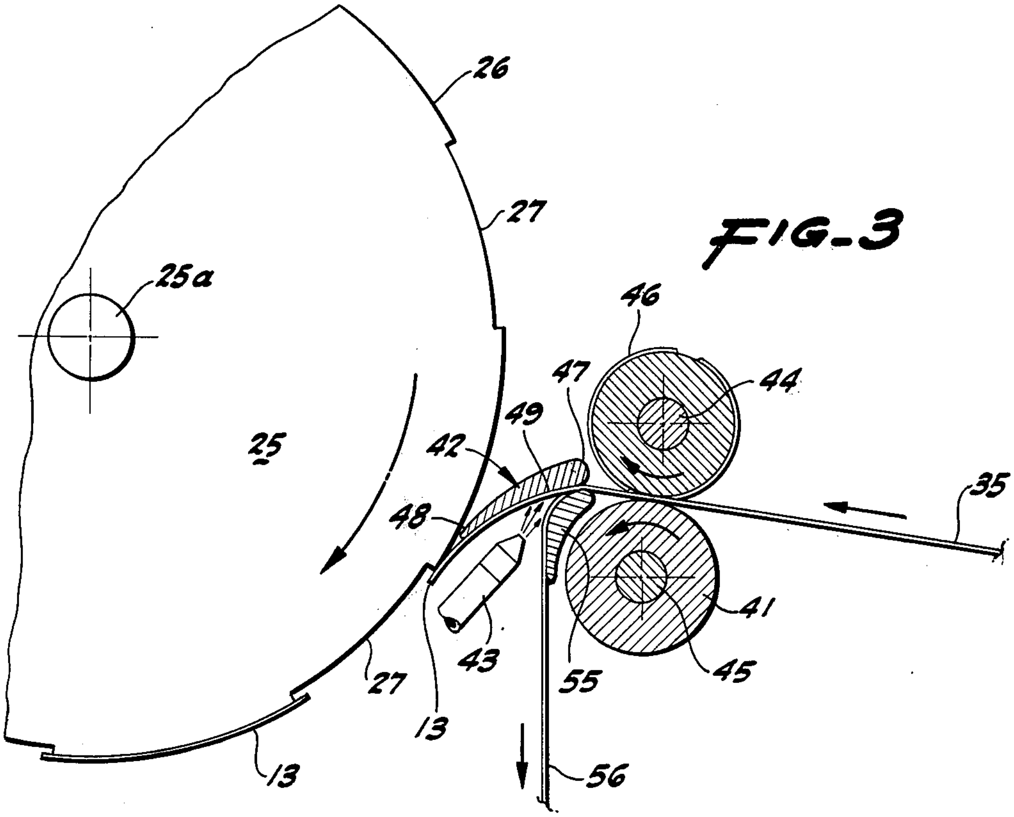
FIG. 3 is a view showing in end elevation the vacuum drum which picks up the labels and showing in transverse cross-section the cutting instrumentalities (a rotary die and a rotary anvil) and showing also means for guiding the severed labels to the vacuum drum and for separating the scrap material from the severed labels.

Referring now to FIG. 3, the rotary die 40 is shown as rotating with a shaft 44 and the anvil roller 41 is shown as rotating on a shaft 45. The shaft 44 is positively driven in timed relation to the remainder of the apparatus. A portion of the knife edge of a typical die is shown at 46, a full profile being shown in FIG. 5. Also shown in FIG. 3 is the guide 42 above mentioned. As will be seen, it has a blunt end 47 and tapers to an edge 48 and has a curvature on its inner surface 49 facing the severed or partially severed label. Also shown is a guide 55 which is located beneath the label and the scrap 56. The end of the guide 55 nearer the die 40 and anvil 41 is curved and has a radius which is smaller than the radius of the anvil 41. As will be apparent, the guide 42 serves to guide the label as it is severed toward one of the pads on the vacuum drum 25. This guidance is assisted by a jet of air from the air nozzle 43. This is particularly helpful where the labels are very limp, for example, certain plastic labels which do not have the stiffness of paper labels. The function and purpose of the guide 55 is to provide a curved guide surface for the scrap 56 having a small radius over which the severed scrap material 56 is pulled. The significance of this is as follows: As a label is severed (even while it is only partially severed from the label stock) and as the scrap material is bent around a radius such as, for example, the radius of the anvil roller 41, there is a natural tendency for the label to proceed in a straight line, i.e. tangent to the anvil roller 41 at its line of contact with the die 40 while the scrap follows the anvil (FIG. 1) or the guide 55 (FIG. 2). This separating or "peeling" function can be performed by the anvil roller alone, as shown in FIG. 1, and it is aided by pulling the scrap around a small radius. If the radius of the anvil 41 is small enough the guide 55 may be dispensed with but if a larger, more massive and larger diameter anvil is used, the guide 55 having a smaller radius is helpful.

Referring now to FIG. 2, a typical operation is there shown. Thus continuous pre-printed label stock 35 is drawn from a roll 36 (see FIG. 1) and is passed between the rotary die 40 and the anvil roller 41, the knife edge of the rotary die being such that it will sever oval labels 13 and leave scrap material 56.

Figure 7:
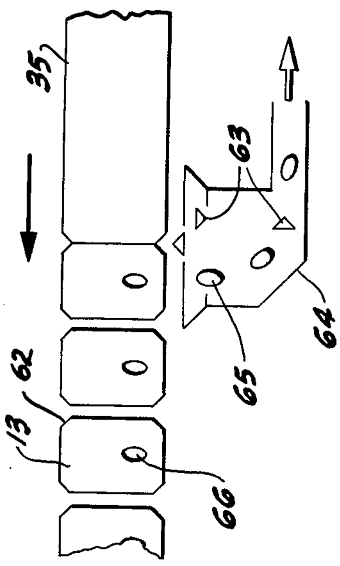
FIG. 7 is a somewhat diagrammatic view showing the manner in which discontinuous scrap is handled.

Referring now to FIG. 7, in some instances the severed label extends the full width of the label stock 35 but its corners are beveled or rounded off as shown at 62, thus leaving discontinuous scrap in the form of small pieces 63 rather than as a continuous piece as shown at 56 in FIG. 2. To remove the pieces of scrap 63, a vacuum member 64 is provided to suck the pieces 63 into it and keep them out of the rest of the machine. The rotary die may also be provided with an interior knife edge (not shown) to cut out pieces 65 from the label stock 35 and to form openings 66 in the labels 13, through which the level of product in a transparent container may be viewed.

Figure 4:
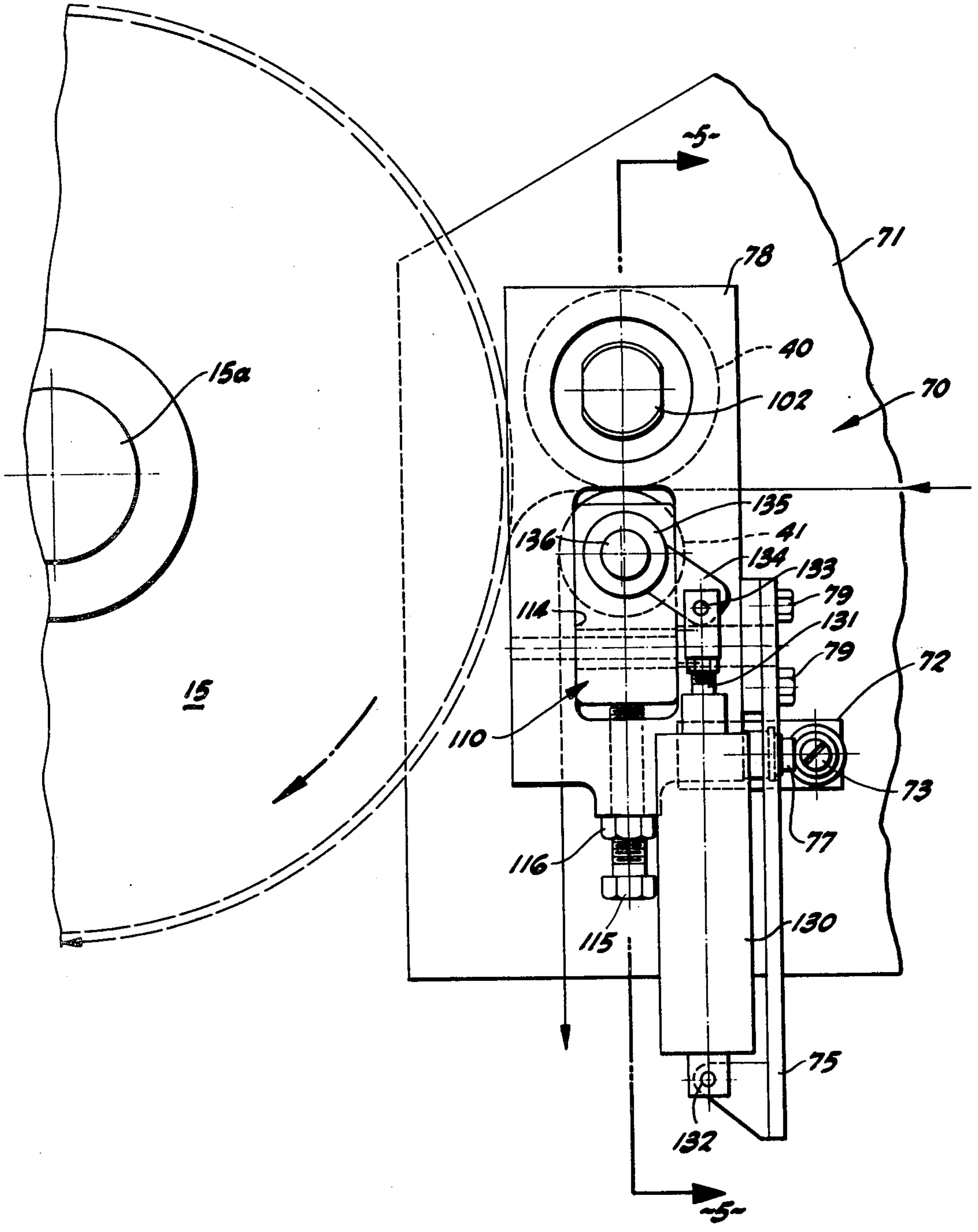
FIG. 4 is a view in end elevation of the die cutter-anvil assembly of the present invention.
Figure 5:
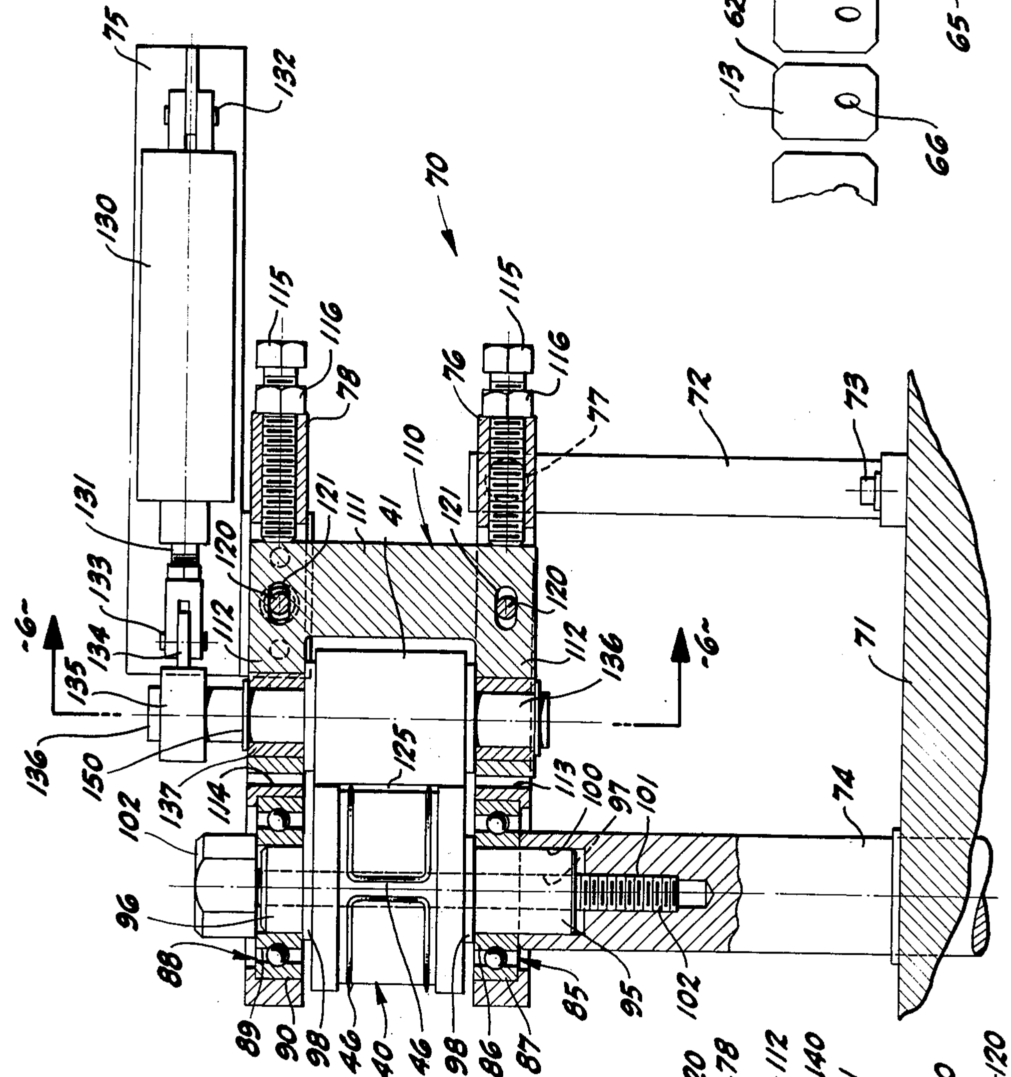
FIG. 5 is a staggered section taken along the line 5—5 of FIG. 4.

Referring now to FIGS. 4 and 5, the preferred form of cutting die-anvil roller assembly is illustrated and is designated generally by the reference numeral 70. This assembly comprises the rotary die cutter 40 and the rotary anvil roller 41 referred to above and shown in other figures. In FIG. 5, two knife edges 46 are shown as having a configuration suited to sever labels of the type shown in FIG. 7. It will be understood, however, that there may be only one knife edge on the die cutter or there may be more than two whereby the die cutter 40 severs one, two or more labels during each revolution according to the number of knife edges 46 and it will also be understood that the configuration of the knife edge 46 may be different than that shown. For example, it may be of a shape to sever oval labels as shown in FIG. 2 or it may be in the form of one or more straight knife edges intended to sever contiguous rectangular labels from the label stock.

The assembly 70 is mounted on the frame 71 by a frame bracket 72 bolted to the frame as shown at 73 and a driving shaft 74 which is rotatable in the frame 71. Another frame bracket 75 is also provided having an L-shape and serving to support the outer portion of the assembly 70 and also an air cylinder which is described hereinbelow.

There is provided an inner plate 76 (i.e. inner in the sense that it is closer to the main frame), the left-hand end of which (as viewed in FIG. 5) is supported in a manner described hereinafter by the driving shaft 74. The other end of the plate 76 is supported at one end by the frame bracket 72 to which it is connected by means of a cap screw 77. An outer plate 78 is also provided which is supported by the bracket 75 to which it is connected by screws 79.

For the purpose of rotatably supporting the die cutter roller 40 in the inner plate 76, that plate is fitted with a ball bearing 85 having an inner race 86 and an outer race 87. The plate 78 is also fitted with a ball bearing 88 including an inner race 89 and an outer race 90. The die cutter roller 40 has extensions 95 and 96 and it is formed with an axial passage 97. These extensions are provided with collars 98 to abut the inner races 86 and 89. The extension 95 is fitted into a socket 100 formed in the driving shaft 74 which is also tapped at 101 to receive the threaded end of a cap screw 102.

The anvil roller 41 is mounted in the following manner: A U-shaped bracket 110 is provided having a base portion 111 and spaced arms 112 and it is received in an opening or slot 113 in the plate 76 and 114 in the plate 78 whereby it can be moved forwardly (toward the die cutter roller 40) or rearwardly (away from the die cutter roller). For this purpose, cap screws 115 are provided which are threaded through the ends of the plates 76 and 78 and bear against the base portion 111 of the bracket 110. Lock nuts 116 are provided to lock the screws 115 in adjusted position. Screws 120 are threaded through the plates 76 and 78 and their upper ends are received in slots 121 formed in the base 111 of the bracket 110.

It will be apparent that by loosening the screws 120 and the lock nuts 116 and adjusting the cap screws 115 the bracket 110, therefore the anvil roller 41, may be moved toward or away from the die cutter roller 40 so that the space 125 between the anvil roller and the cutter roller are equal to the height of the knife edge above the cylindrical surface of the die cutter. When suitable adjustment has been made the nuts 116 and screws 120 are tightened to lock the anvil roller in place.

Figure 6:
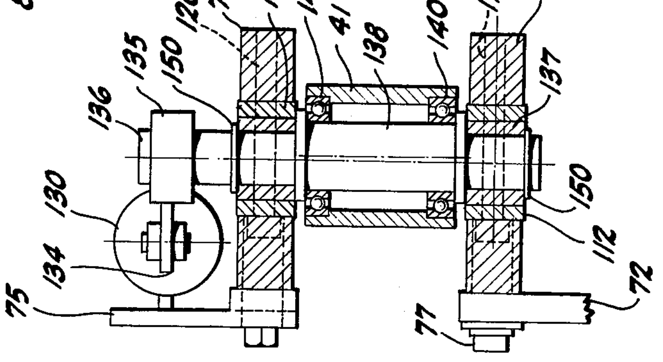
FIG. 6 is a section taken along the line 6—6 of FIG. 5.

Referring now to FIG. 6 as well as FIGS. 4 and 5, the air cylinder 130 has a rod 131 and is pivotally mounted at 132 on bracket 75. The outer end of rod 131 is pivotally connected at 133 to a lever 134 which is integral with a collar 135 which is fixed to one end of a shaft 136 which is rotatable in bearings 137 mounted in arms 112 of U-shaped bracket 110. The mid portion 138 of shaft 136 is eccentric to the axis of shaft 136. Anvil roller 41 is mounted on bearings 140 which are concentric to mid portion 138. It will be apparent that on rotation of shaft 136 this eccentric mounting of anvil roller 41 will cause it to shift slightly in relation to the die cutter roller 40.

The air cylinder 130 is connected to a valve (not shown) which is normally (i.e. during normal operation of the apparatus) in a position such as to hold the piston rod 131 in the retracted position shown in FIGS. 4 and 5 whereby the anvil roller 41 is held in the operative position illustrated in FIG. 5 whereby rotation of the die cutter 40 causes labels to be severed. In the event that the apparatus is stopped, e.g. at the end of a shift, or because of a breakdown of the apparatus, or because a container is missing in the container feed, then by control mechanism which is well known in the art label stock feed roller 38 and gate (not shown) which connects the supply of containers to the wheel 15 stop, and are started again in synchronism such that the label about to be severed at the time of stoppage is supplied to the proper pad 26 and the proper container 17 when operation resumes. However, in the meantime the die cutter 40 will continue rotation and its continued rotation during stoppage will (unless the label stock at the junction of the rollers 40 and 41 is withdrawn from the die cutter 40) chew up the label stock between the two rollers 40 and 41. This will cause a container to go by without a label, or it will mangle the label and cause the glue applicator 28 to apply glue to the surface of the drum 25, etc. The control mechanism of the apparatus therefore causes the rod 131 to be extended. This will rotate the shaft 136. The eccentric mounting of the anvil roller 41 will cause that roller to be retracted from the cutter 40. As shown in FIG. 1, the label stock is curved around the anvil roller 41, therefore it will follow the anvil roller and will be retracted from the cutter 40.

An advantage of the assembly 70 is that it is easily mounted on and detached from the frame as a unit, either in its entirety by unscrewing screw 102 and screw 77, or partially by unscrewing screw 102 and the inside screw 120 (which leaves the inner plate 76 intact). By this means the unit 70 can be partially or completely detached for repairs or replacement. Retainer rings 150 can be removed to allow removal of the anvil roller 41 from the bracket 110. It will be apparent that when the assembly 70 is partly or completely detached from the frame 71, the die cutter 40 can also be removed from the assembly 70. By such means these members (the die cutter 40 and the anvil 41) can be removed for repairs or for replacement, e.g. for replacement of die cutter 40 with another die cutter having a knife edge 46 of different profile.

It will be apparent that, although the die cutter-anvil assembly 70 has been described with reference to its use in the continuous label cutting, label applying apparatus of the aforesaid Hoffmann invention, that it has wider applicability, e.g. to the severance of rectangular labels printed contiguously on label stock (in which case the knife edge or edges 46 are a straight knife edge); and that it is adapted to continuous cutting operations generally where a continuous film, ribbon or web is to be severed into segments.

It will therefore be apparent that a new and useful rotary die cutter-rotary anvil assembly has been provided.

I claim:

1. A rotary die cutter-rotary anvil assembly comprising (a) a main frame and a driving shaft mounted on and projecting from said main frame, (b) a cylindrical rotary die having formed on its cylindrical surface a knife edge for severing a continuous web or the like into segments, (c) a cylindrical rotary anvil roller, (d) a sub-frame for holding said die and anvil in parallel and in tangent, operating contact for severance of segments from such a web passing between the die and anvil, said sub-frame comprising:

a first sub-frame member supported by the projecting end of said driving shaft by means allowing rotation of the driving shaft relatively to the first sub-frame member, a second sub-frame member spaced from the first sub-frame member and more remote than the first sub-frame member from the main frame, and means rotatably mounting the rotary die and rotary anvil in parallel between the first and second sub-frame members including means connecting the rotary die with the driving shaft for rotation thereby.

2. The assembly of claim 1 including a third sub-frame member mounted for movement on said first and second sub-frame members toward and from the die, said third sub-frame member mounting the anvil, and means for securing the third sub-frame member in adjusted position.

3. In apparatus including a web feed for continuous feed of a continuous web to a rotary cutter for continuously severing the web into segments, such apparatus including means for continuously receiving such segments as they are severed and transporting them away from the cutter, said apparatus including a stationary frame and a driving shaft rotatably supported by and having an end projecting from said stationary frame, the improvement which comprises a detachable rotary die cutter-rotary anvil assembly, such assembly comprising:

(a) spaced, parallel first and second assembly frame members, (b) said first frame member rotatably receiving the projecting end of said driving shaft, said shaft providing partial support for such first frame member, said first frame member having further detachable support on said stationary frame, whereby the first frame member may be attached to and detached from such stationary frame, (c) a rotary die cutter having and end remote from said first frame member and rotatably carried by said second frame member, (d) means detachably connecting the other end of said die cutter to the projecting end of said driving shaft for rotation thereby, (e) a rotary anvil (f) means mounting said anvil parallel to and in operative contact with said die cutter, such means detachably mounting one end of the anvil on said first frame member and the other end on said second frame member.

4. The apparatus of claim 3 wherein said means (d) is in the form of a screw extending axially through the die cutter from its remote end and threaded into said driving shaft.

5. The apparatus of claim 3 including a sub-frame detachably carried by and bridging said first and second frame members, said anvil roller being rotatably carried by said sub-frame, said sub-frame being adjustably mounted on said first and second frame members for adjustment in relation to said die cutter.

6. The apparatus of claim 5 wherein the mounting of the anvil on the sub-frame is eccentric and said assembly is provided with means for automatically operating such eccentric mounting to cause the anvil to approach or recede from the die cutter.

* * * * *